Dec. 3, 1957   H. R. HOYT   2,815,107
INTERMITTENTLY OPERABLE ROTARY CLUTCH UNIT
Filed March 21, 1955   3 Sheets-Sheet 1

INVENTOR.
Harold R. Hoyt
BY
ATTORNEY.

Dec. 3, 1957   H. R. HOYT   2,815,107
INTERMITTENTLY OPERABLE ROTARY CLUTCH UNIT
Filed March 21, 1955   3 Sheets-Sheet 2

INVENTOR.
Harold R. Hoyt
BY
ATTORNEY.

Dec. 3, 1957            H. R. HOYT            2,815,107
INTERMITTENTLY OPERABLE ROTARY CLUTCH UNIT
Filed March 21, 1955            3 Sheets-Sheet 3
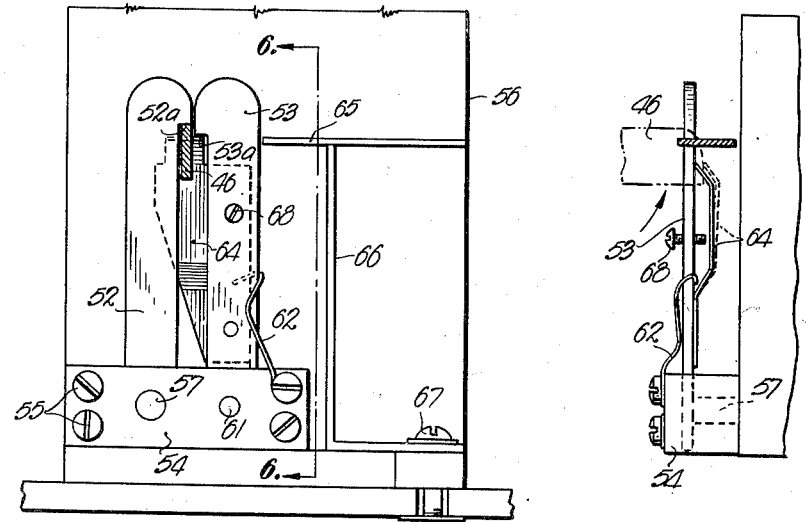
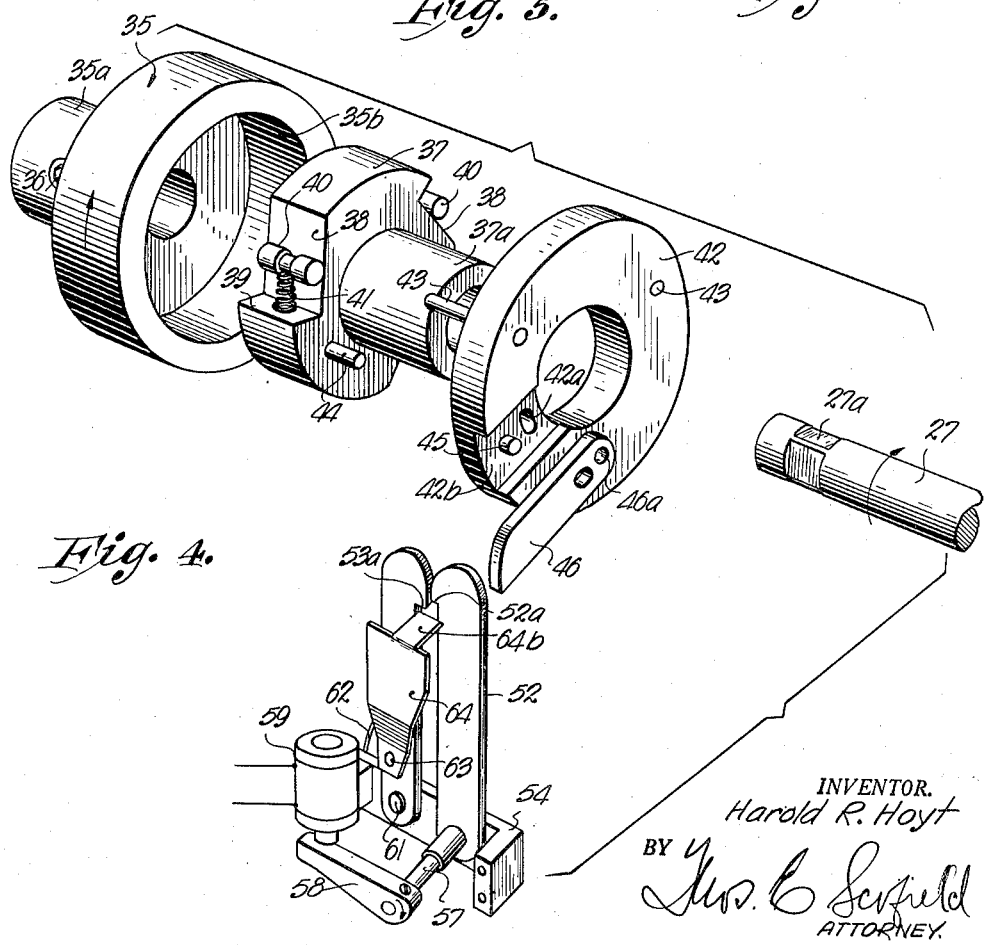
INVENTOR.
Harold R. Hoyt
BY
ATTORNEY.

United States Patent Office 2,815,107
Patented Dec. 3, 1957

2,815,107

INTERMITTENTLY OPERABLE ROTARY CLUTCH UNIT

Harold R. Hoyt, Roeland Park, Kans., assignor to Great Lake Pipe Line Company, Kansas City, Mo., a corporation of Delaware Application March 21, 1955, Serial No. 495,572

11 Claims. (Cl. 192—22)

This invention relates to an intermittently operable rotary clutch unit, and refers more particularly to a unit of this type particularly adaptable for use in systems wherein it is desirable to obtain intermittent operation of a pump from a continuous drive source in response to impulses received from an impulse generating mechanism remote from the pump.

As will be familiar to those engaged in any field in which the proportional mixing of liquids plays an important part, for example, in the chemical industry or in the refining and preparation of petroleum products, the need often arises for mechanism for injecting a secondary fluid into a primary fluid in a predetermined proportion. A specific example is in the preparation of motor fuels. In recent years more and more emphasis has been placed on the mixing of various additives with the basic gasoline.

The present invention has for its primary object the provision of improved apparatus wherein feeding of a secondary fluid into the primary fluid is controlled to maintain the proper proportions between the two fluids. In the preferred embodiment of the invention, the feeding mechanism is controlled by the rate of flow of the primary fluid through a pipe line, the feeding mechanism being actuated at such intervals as are necessary to obtain the proper quantity of secondary fluid per unit of volume of primary fluid passing through the line during a given time interval.

An important feature of the invention is the provision of a unique clutch mechanism and control means for producing intermittent operation of a feed pump. In a preferred embodiment of the invention, the clutch mechanism provides an interruptible drive connection between a constantly running motor and the pump. The control means includes mechanism normally interrupting the drive but capable of periodically causing re-engagement of the drive to produce an intermittent pumping operation.

An object of the invention is to provide a drive and control mechanism which can be adjusted to cause either a single or double stroke of a positive displacement pump for each impulse received from the control actuating means. This provides, along with adjustability of the length of the pump stroke, a wide range of flexibility for the apparatus, any pump of a given size being made capable of delivering either a small or relatively large quantity of secondary fluid for each impulse of the control actuating means. As an example, a pump capable of delivering 10 ccs. of fluid per stroke can be made capable, when used with the present invention, of delivering fluid through a range of from 0 to 20 ccs. per impulse received from the control actuating means.

Still another object of the invention is to provide a control mechanism for the pump and pump drive whereby pumping of the secondary fluid is halted in the event of stoppage of flow of the primary fluid through its pipe line. An important feature of the invention in this respect is the provision of a safety latch arrangement through which operation of the pump is halted despite accidental locking of the main trip-latch in the open position.

Other objects of the invention together with the features of novelty appurtenant thereto will appear during the course of the following description.

In the accompanying drawings which form a part of the instant specification and are to be read in conjunction therewith and in which like reference numerals indicate like parts in the various views;

Fig. 4 is an exploded perspective view showing the details of the clutch assembly for the pump, and the releasable latch means therefor;

Fig. 5 is an enlarged view of the releasable latch means taken along the line 5—5 of Fig. 1 in the direction of the arrows;

Fig. 6 is a view of the latch means taken along the line 6—6 of Fig. 5 in the direction of the arrows;

Fig. 7 is a partially schematic elevation similar to Fig. 5 showing the latches in the normal or drive interrupting position;

Fig. 8 is a partially schematic elevation of the latching arms similar to Fig. 7 but showing the respective positions of the parts when the left-hand latch has been shifted to release the clutch arm;

Fig. 9 is a partially schematic elevation of the latches similar to Figs. 7 and 8 but showing the respective positions of the parts assumed, should the impulse generating means stop in the open or "pumping" position.

Figure 1:
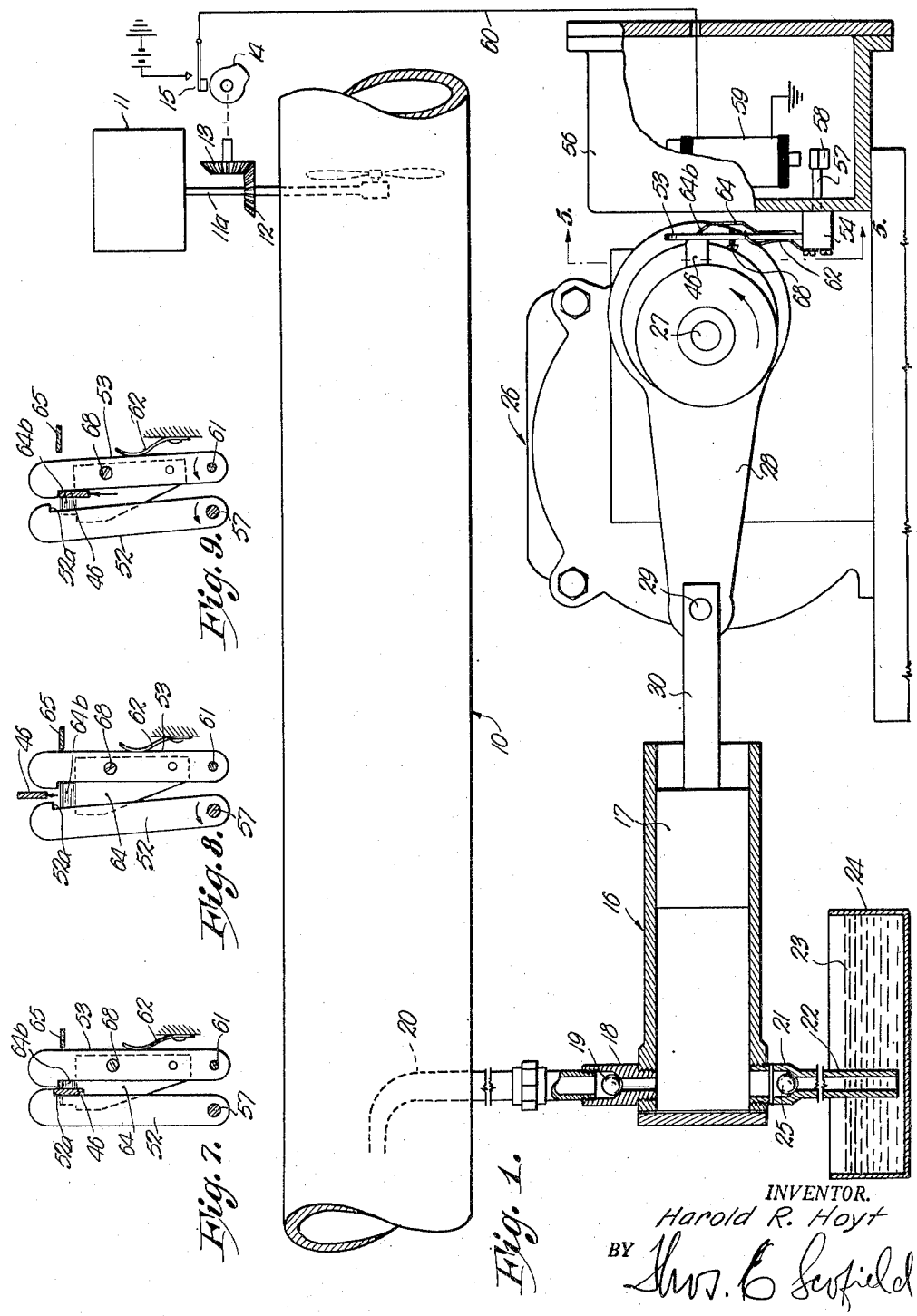
Fig. 1 is a partially schematic side elevation of a fluid mixing system embodying the invention, parts being broken away for purposes of illustration.

Referring to the drawings, Fig. 1 illustrates a typical fluid mixing system embodying the invention, and shows the particular suitability of the invention for use in situations where it is desired to proportionally feed a secondary fluid into a stream of primary fluid flowing through a pipe line or other conduit.

Reference numeral 10 indicates generally a pipe line through which flows a continuous stream of primary fluid, for example, gasoline. To measure the rate of flow there is provided flow meter 11 which is of the conventional rotary type. A bevel gear 12 is secured to the shaft 11a of the flow meter and a second bevel gear 13 meshes therewith to drive rotary cam 14 through a conventional rotary drive connection which may include a speed reducer (not shown). Cam 14 periodically closes a switch 15 in an electrical circuit which is connected with the injection pump assembly and which will be hereinafter described.

The injection pump for feeding secondary fluid into line 10 is preferably of the positive displacement type, having cylinder 16 within which reciprocates piston 17. A discharge nipple 18 provided with inwardly closing ball-check valve 19 is connected with the cylinder 16. Leading from the discharge nipple to the interior of line 10 is the discharge conduit 20. An intake nipple 21 is also connected with the pump, the nipple being coupled with an intake conduit 22 which communicates with a source of secondary fluid 23 contained in a tank or other container 24. An outwardly closing ball-check valve 25 is provided in the intake line to prevent back flow from the pump.

To reciprocate the piston there is provided a motor 26 which, as will be hereinafter described, rotates shaft 27 to drive pitman 28. The end of the pitman is pivotally connected by a cross pin 29 between two links 30, which extend longitudinally from and are rigidly secured to piston 17.

Figure 2:
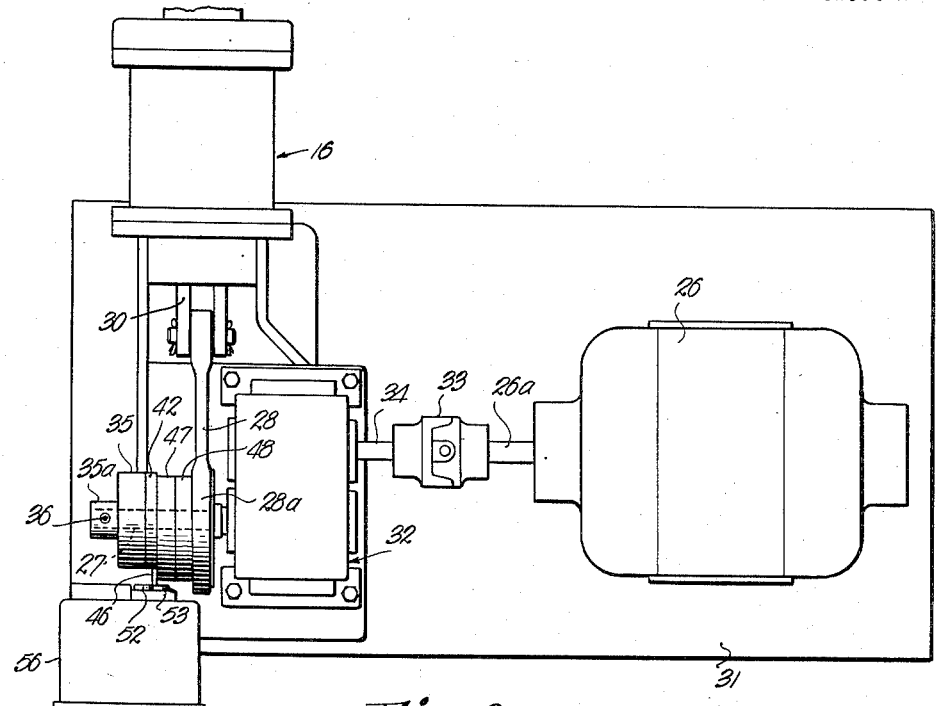
Fig. 2 is a top plan view of the pump and clutch assembly.

As may be best appreciated from Fig. 2, motor 26 is mounted on a base plate 31 and is coupled with the input end of a conventional speed reducer 32 (also mounted on base plate 31) through motor drive shaft 26a, a flexible coupling 33, and the speed reducer shaft 34. The output shaft of the speed reducer is indicated at 27 and its outer end is visible in Fig. 1. Connected with the shaft 27 and operated thereby is the clutch assembly now to be described.

Figure 3:
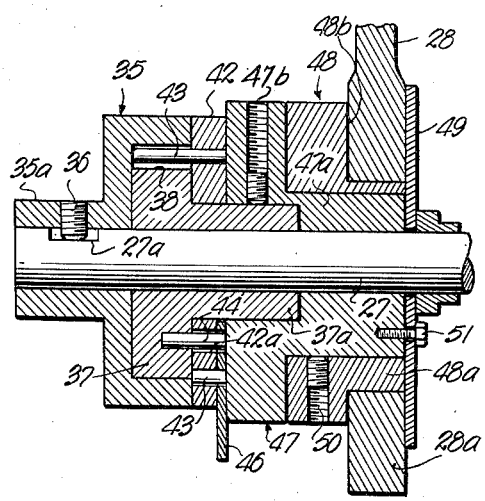
Fig. 3 is a longitudinal cross section through the clutch assembly.

Referring collectively to Figs. 2, 3 and 4, it will be noted that shaft 27 extends centrally through an assembly of parts, the outermost one of which is a cup-like cylindrical member 35 having boss 35a. Member 35 is keyed securely to shaft 27 by a lateral set screw 36 which engages a flattened peripheral recess 27a in the shaft and at all times rotates therewith as the latter is driven by motor 26. The next part in the assembly is the cylindrical plug 37 which nests rotatably within the cup-shaped member 35 and which has formed integral therewith the sleeve portion 37a. Plug 37 and its sleeve portion 37a are bored centrally to slidably fit over the shaft 27. As is best seen in Fig. 4, the plug is provided equiangularly around its periphery with a plurality of pockets or recesses having non-radial inclined bearing surfaces 38 which terminate at their trailing edges in abrupt walls 39. Located in each pocket are wedge members in the form of rollers 40 which are free to move in either direction on the surfaces 38 but which are continually urged outwardly toward the periphery of the plug by springs 41 to wedge firmly between the inner surface 35b of the cup-shaped member 35 and the inclined bearing surfaces 38.

Rotatably fitting over the sleeve 37a and abutting the annular margin of the cup-shaped member 35 is the annular clutch disk 42. Extending axially toward member 35 from the inner face of disk 42 are equiangularly spaced fingers 43, which project into the pockets in the plug 37 to lie alongside the wedge members 40. The fingers 43 are of smaller diameter than the wedge members and in the assembled unit lie on opposite sides of the wedge members from springs 41, or between the wedge members and the periphery of the plug. Disk 42 is connected for rotation with the plug through a lost motion connection provided by a peg 44 extending in an axial direction from the outer face of plug 37 and received in an arcuate slot 42a formed in disk 42. A radial recess 42b is provided in the outer face of disk 42. Pivoted therein by post 45 is a radially projecting arm 46. Arm 46 is also provided with an aperture 46a registering with slot 42a, disk 42 and likewise receiving peg 44. It is important to understand that the width of arm 46 with respect to the width of recess 42b is such that the arm is free to pivot to a limited extent within the recess about its pivot post 45. The extent of movement is that necessary to permit peg 44 to shift from one end of slot 42a to the other so that the disk 42 can be rotated relative plug 37 through a displacement equal to the length of the slot.

It should be noted at this point that the length of slot 42a is such that when disk 42 is located at the extreme counterclockwise limit of its rotation relative to plug 37 (limited by the peg 44 reaching the upper end of slot 42a as seen in Fig. 4), fingers 43 displace rollers 40 inwardly and out of wedging relationship between surface 35b and the bearing surfaces 38. On the other hand when peg 44 is at the opposite end of the slot 42a (disk 42 turned clockwise relative to plug 37 to its extreme clockwise limit, governed by peg 44 reaching the end of the slot) the rollers 40 are in wedging position between surface 45b and the respective bearing surfaces 38. This latter position is what might be termed the "normal" position of the disk since springs 41, unless counteracted, continually urge rollers 40 into their tightly wedged position. In this normal position, the arm 46 lies at an angle with the major axis of the recess. If a downward face is applied to the outer end of arm 46 (as viewed in Fig. 4), not only will rotation of disk 42 be stopped but also the arm 46 will exert a direct turning moment on plug 37 tending to cause a positive relative movement therebetween. This action of the arm 46 coupled with the force exerted against the rollers 40 by fingers 43 causes the rollers to be displaced inwardly out of wedging relation between surface 35b and the respective bearing surfaces 38, and the drive connection between members 35 and plug 37 is broken. Upon release of the arm 46, the rollers are also released, and under the influence of springs 41 they return to their normal wedging position wherein member 35 is drivingly connected with plug 37.

Turning now more particularly to Figs. 2 and 3, the drive and clutch assembly is completed by the adjustable double eccentric comprising (1) the inner eccentric member 47 counterbored to fit over sleeve 37a and having the projecting eccentric sleeve 47a, and (2), the outer eccentric member 48. Member 47 is releasably secured by lateral set screw 47b to the sleeve 37a to rotate therewith and the eccentric member 48 is adjustably secured in like manner to member 47 by lateral set screw 50. It will be noted from Fig. 3 that the eccentric portion 48a of member 48 is reduced in diameter at its outer end to provide an inner retaining wall 48b for the annular ring portion 28a of the pitman 28 for the pump. The ring 28a rotatably fits over eccentric sleeve 48a and is retained thereon by the annular plate 49 secured to sleeve 47a by bolts 51 threaded into the outer end of the latter. For maximum stroke of the pump piston 17, eccentric 48 is so positioned with respect to eccentric 47 that the thickest portion of the former corresponds in location with the thickest portion of the latter (Fig. 3). Set screw 50 serves to secure the two eccentrics together against relative rotation but can be loosened so that adjustment is possible.

From the foregoing description, the manner of operation of the clutch assembly should be evident. With no restraining forces being imposed on clutch disk 42, wedge members 40 are firmly wedged between surfaces 35b and 38. Thus, rotation of the shaft 27 is transmitted through member 35 to the plug 37 and the eccentrics 47 and 48 secured thereto. Member 35 is the "drive member" and the plug 37 is the "driven member." In other words, shaft 27, member 35, plug 37, disk 42 and eccentrics 47 and 48 turn as a unit, and the pitman 28 by virtue of its connection with the eccentrics reciprocates the piston 17 of the pump. However, if a reverse turning moment or braking force is applied to disk 42 through arm 46 the wedge members 40 are immediately disengaged as hereinbefore described. With the drive connection between the member 35 and plug 37 broken, shaft 27 continues to rotate within the assembly but eccentrics 47 and 48 remain stationary and the pump thus ceases operation.

In the preferred embodiment of the invention, the necessary braking force or reverse turning moment necessary to break the drive connection to the pump is provided by a stop means comprising a pair of parallel side-by-side upright pivotal latches 52 and 53 positioned to one side of and in fairly close proximity to the clutch assembly. As will be presently made clear, it is the trip latch 52 which provides the basic control, the follower latch 53 serving only as a safety latch to prevent continuous operation of the pump should latch 52 become locked in the open position.

The trip latch 52 and follower latch are both pivotally supported on the U-shaped bridge member 54 secured by screws 55 to the face of a housing 56. Trip latch 52 is mounted on a shaft 57 which is journaled at one end in the bridge member and projects rearwardly into housing 56. A crank lever 58 is secured to that end of shaft 57 within the housing. Solenoid 59 is provided within the housing, the solenoid, when energized, lifting crank lever 58 to rotate latch 52 in the direction illustrated by the arrows in Figs. 4 and 8. Energization of the solenoid is intermittent, being controlled by cam 14 which opens and closes the switch 15 in the circuit 60 (Fig. 1).

The purpose of trip latch 52 is to engage and hold the arm 46 extending from clutch disk 42, and to this end there is provided on the latch the shoulder 52a which in the unenergized state of the solenoid lies in the plane of the arm 46.

The follower latch 53 is pivoted to bridge 54 by pin 61 and is continually urged toward the trip latch 52 and arm 46 by the spring 62. The follower latch is also provided with a shoulder 53a confronting arm 46. However, it will be noted that the shoulder 53a is located below shoulder 52a and that when arm 46 is engaged by the trip latch 52 the follower latch bears against the side of arm 46 with the shoulder 53a below the top of the arm and not engaged therewith (Fig. 7).

Secured to the rear of latch 53 by rivet 63 is a flat leaf-spring 64 provided at its upper end with the bent lip 64b. The spring and lip are so arranged and so formed as to cause the lip to move forwardly between the follower latch 52 and trip latch 53 upon separation of the two as shown in Fig. 8 and upon movement of disk arm 46 away from the latch assembly. In the normal latch position of arm 46 (Figs. 5 and 7) spring 64 is displaced by the end of the disk arm 46 (see Fig. 6), and is under constant tension. A flange-like stop element 65 is positioned adjacent the upper end of the follower latch 53 to limit its movement in a direction away from trip latch 53; stop 65 is supported on an L-shaped member 66 secured to the base of the solenoid housing by bolt 67. A screw 68 is threaded through latch 52, and its purpose will be hereinafter described.

*Operation*

In describing the operation of the invention, it will be assumed that a primary fluid, for example, gasoline, is being pumped in a continuous stream through pipe line 10. The reservoir or container 24 for the secondary fluid is filled with a suitable additive, for example, tricresyl phosphate, to be fed into the gasoline is a predetermined proportion. It will also be assumed that the volumetric rate of flow of the gasoline varies.

Motor 26 for the pump 16 is connected with a suitable energy source (not shown) and during operation is driven at a substantially constant speed, thus rotating shaft 27 through the speed reducer 32. The cup-shaped member 35 (the drive member for the clutch assembly) is continuously rotated with shaft 27 by virtue of being keyed thereto and at all times during operation is also rotating at a substantially constant speed. However, by virtue of the engagement of trip latch 52 with arm 46, wedge members 40 in the clutch are restrained by fingers 43 from wedging engagement between plug 37 and driving member 35. It will thus be evident that so long as trip latch 52 remains engaged with arm 46, plug 37, disk 42 and eccentrics 47 and 48 remain stationary, the shaft 27 rotating freely therein. The pump is thus idle and no fluid is being injected into line 10.

As the primary fluid flows through the line 10, it actuates flow meter shaft 11a which in turn drives the rotary cam 14 through gears 12 and 13. Once each revolution of the cam, switch 15 is closed for a short interval, thereby energizing solenoid 59 and causing crank lever 58 to turn trip latch 52 to the position shown in Fig. 8. This immediately releases arm 46 and thus frees disk 42 for rotation. Under the influence of springs 41 and the frictional drag of shaft 27 within plug 37 the wedge rollers 40 move outwardly and wedge tightly between member 35 and the inclined surfaces 38; plug 37 thus becomes the driven member of the clutch assembly.

It will be understood, of course, that disk 42 turns with the plug 37 once the arm 46 has been released and that at the end of a complete revolution of the disk, the arm 46 returns to the position indicated in Figs. 5, 6 and 7. A special feature of the invention resides in the fact that means have been provided whereby by a slight manual adjustment the arm 46 can be re-engaged by latch 52 either at the end of a single revolution or on the other hand can be permitted to proceed through a second revolution before being stopped despite the fact that the cam 15 has not yet caused another impulse to be transmitted to the solenoid. It is believed that a clearer understanding of this feature can best be obtained by describing each situation separately.

Since Figs. 7 through 9 illustrate the second situation, that is two complete revolutions of plug 37 and the associated eccentrics 47 and 48 with a concurrent double stroke of the pump for each revolution of cam 14, this situation will be described first.

It has been pointed out earlier herein how the cam 14 closes switch 15 for a short interval during each revolution of the cam thereby energizing solenoid 59 and causing trip latch 52 to pivot out of engagement with arm 46 (Fig. 8). Immediately this occurs arm 46 rises and permits the lip 64b on spring 64 to snap into the widened space between the trip latch 52 and follower latch 53. So long as lip 64 is positioned between the latches, they will remain in the position shown in Fig. 8. It is important to provide the trip latch 52 with a stronger return moment (the moment created by the weight of crank arm 58) than the moment exerted by spring 62 so that the follower latch 53 will be retained in its vertical position against stop 65 as shown in Fig. 8.

Near the end of the first revolution of disk 42, the arm 46 approaches the position shown in Fig. 6 from below and just prior to reaching its normal latch disposition engages the lip 64b to force it out from between the latches 52 and 53. However, before latch 52 can return to the vertical position necessary to catch arm 46, that is, so that shoulder 52a lies in the path of the arm, the upper edge of the arm has moved upwardly beyond the latching position and the arm and disk are free to turn through another complete revolution. During this last revolution, however, latch 52 assumes the position shown in Fig. 7, the lip 64b bearing against the rear surface of the latch. When arm 46 returns at the end of the revolution it is therefore engaged by shoulder 52a and the drive connection between the motor and pump is disrupted in the fashion hereinbefore described. This two-stroke cycle is repeated for each complete revolution of cam 14, which in turn is governed by volumetric flow rate through the pipe line.

To adjust the apparatus for single stroke operation of the pump for each impulse received at the solenoid, screw 68 is twisted sufficiently to engage leaf-spring 64 and hold it in the position shown in Fig. 6. Lip 64a of the spring is thus prevented from moving into position between latches 52 and 53 at any time and latch 52 returns to latching position immediately upon departure of arm 46 and reopening of switch 15. As a result, at the end of the first revolution of the disk 42 and driven clutch members, arm 46 will again be engaged to disrupt the drive connection. Each revolution of cam 14 thus results in only one stroke of the pump. Of course, to obtain two-stroke operation, it is necessary only to return screw 68 to its original position thus freeing spring 64 to act as a spreader between latches 52 and 53.

The follower latch 53 does away with the possibility of the pump continuing to run indefinitely should cam 14 stop rotating at the point when switch 15 is closed and solenoid 59 energized to hold open trip latch 52. Such might occur in event of a breakdown in the primary fluid pumping system—flow through pipe 10 being stopped, or in the event of failure in the flow meter or drive system for cam 14. It is believed evident from Fig. 9 that should trip latch 52 fail to return to its original position, spring 62 will force the follower latch 53 counter-clockwise so that as the arm 46 approaches again it will be caught and held. Follower latch 53 is operative either in the single or double stroke situation.

From the foregoing, it is believed amply clear that all of the advantages and objects hereinbefore set forth have been accomplished. The flexibility provided by the adjustability of the eccentric 48 to alter the length of the stroke and the option of single or double stroke operation makes it possible to use a pump of one given capacity in many situations where the fixed proportions desired will differ substantially. The controlled operation of the pump assures of automatic correct proportioning of the two fluids. The unit is simple and easy to manufacture and is sufficiently rugged to withstand continuous operation over long periods without failure.

From the foregoing it will be seen that this invention is one well adapted to attain all of the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims.

Inasmuch as many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a rotary clutch assembly of the type having driving and driven members and a rotary clutch control member rotating with said driving and driven members when the clutch is engaged and operable, upon the application of an antirotation force thereto, to disengage said driving member from said driven member, the combination of an arm secured to said control member and rotatable therewith, said arm extending outwardly therefrom in a direction transverse to the axis of rotation, a first movable latch member having a portion normally lying in the path of said arm to engage same and place said clutch in disengaged condition, impulse means for momentarily shifting said first latch member to displace said portion from the path of said arm thereby to place said clutch in engaged condition, yieldable means tending to urge said first member back to its normal position upon the completion of said impulse, and means releasably maintaining said latch member in its displaced position until after said arm has entered its second complete revolution, said means operated by the passage of said arm from the first to the second revolution.

2. A clutch assembly as in claim 1 including adjustable means for rendering said last mentioned means inoperative thereby to cause said latch to engage said arm at the end of each revolution thereof.

3. In a rotary clutch assembly of the type having driving and driven members and a rotary clutch control member rotating with said driving and driven members when the clutch is engaged and operable, upon the application of an anti-rotation force thereto, to disengage said driving member from said driven member, stop means operatively associated with said control member and normally preventing rotation of same thereby to maintain said clutch in disengaged condition, yieldable means continually urging said stop means toward its normal position, impulse means for momentarily shifting said stop means to a second position in which said control member is freed for rotation thereby to cause engagement of said clutch, and means independent of said impulse means for preventing the return of said stop means to said normal position until after control member has passed through at least one complete revolution.

4. In an intermittently operable clutch unit, a driving shaft continuously turning in one direction, a driven shaft aligned with said driving shaft, a clutch mechanism connecting said driving shaft and said driven shaft having a free wheeling condition in which no power is transmitted and said shafts are free to rotate relative one another and an operative condition in which said driving shaft is rotatively coupled with said driven shaft, said mechanism including a clutch control disk normally turning with said shafts when said clutch is in said operative condition and having a laterally extending arm, said control disk operative, when an anti-rotation force is applied thereto, to place said clutch mechanism in said free wheeling condition and when said anti-rotation force is removed, to cause said clutch mechanism to shift to said operative condition, a shiftable latch member having a portion thereof normally lying in the path of said arm and engaging same against rotation whereby said clutch mechanism is in free wheeling condition, impulse means for momentarily shifting said latch member to displace said portion from the path of said arm thereby to release same to place said clutch mechanism in operative condition, yieldable means tending to return said latch to said normal position, and means releasably maintaining said latch member in its displaced position until after said arm has completed one revolution, said means operable by said arm to cause said latch member to return to its normal position to engage said arm at the end of its second revolution.

5. A clutch unit as in claim 4, including adjustable means for rendering said last mentioned means inoperative thereby to cause said latch to engage said arm at the end of each revolution thereof.

6. In an intermittently operable clutch unit, a driving shaft continuously turning in one direction, a driven shaft aligned with said driving shaft, a clutch mechanism connecting said driving shaft and said driven shaft having a free wheeling condition in which no power is transmitted and said shafts are free to rotate relative one another and an operative condition in which said driving shaft is rotatively connected with said driven shaft, said mechanism including a clutch control disk having a laterally extending arm, said disk and arm rotating with said shafts when said clutch is in said operative condition, a shiftable latch member having a portion normally lying in the path of said arm and adapted to engage same to stop the rotation of said arm and control disk, said control disk being so arranged with respect to said clutch mechanism as to place said clutch mechanism in said free wheeling condition on engagement of said arm with said first latch member, impulse means for momentarily shifting said first latch member to displace said portion from the path of said arm thereby to place said clutch in operative condition, yieldable means tending to urge said first latch member back to its normal position upon completion of said impulse, and means releasably maintaining said latch member in its displaced condition until after said arm has entered its second complete revolution following the initial shifting of said first latch member, said means operated by the passage of said arm from the first to the second revolution.

7. A clutch unit as in claim 6 including adjustable means for rendering said last mentioned means inoperative thereby to cause said latch to engage said arm at the end of each revolution thereof.

8. In an intermittently operable clutch unit, a driving shaft, a driven shaft aligned with said driving shaft, a clutch mechanism connecting said driving shaft and said driven shaft having a free wheeling condition in which no power is transmitted and said shafts are free to rotate relative one another and an operative condition in which said driving shaft is rotatively coupled with said driven shaft, said mechanism including a clutch control member normally turning with said shafts and operative, when an anti-rotation force is applied thereto, to place said clutch mechanism in said free wheeling condition, shiftable stop means operatively associated with said control member and normally preventing rotation of same thereby to maintain said clutch mechanism in said free wheeling condition, impulse means for momentarily shifting said stop means to a second position in which said member is freed for rotation thereby to place said clutch mechanism in operative condition, and means independent of said impulse means for preventing return of said stop means to said normal position until after said control member has passed through at least one complete revolution following the initial shifting of said stop means.

9. In an intermittently operable clutch unit, a driving shaft continuously turning in one direction, a driven shaft aligned with said driving shaft, a clutch mechanism connecting said driving shaft and said driven shaft having a free wheeling condition in which no power is transmitted and said shafts are free to rotate relative one another and an operative condition in which said driving shaft is rotatively connected with said driven shaft, said mechanism including a clutch control disk having a laterally extending arm, said disk and arm rotating with said shafts when said clutch is in said operative condition, a first movable latch member having a portion normally lying in the path of said arm and adapted to engage same to stop the rotation of said arm and control disk, said control disk being so arranged with respect to said clutch mechanism as to place said clutch mechanism in said free wheeling condition on engagement of said arm with said first latch member, impulse means for momentarily shifting said first latch member to displace said portion from the path of said arm thereby to release same to place said clutch in operative condition, yieldable means tending to return said first latch member to said normal position, and a separate safety latch member adapted to move into and remain in the path of said arm to engage same in the event of said first latch member becoming arrested in its displaced position thereby to engage said arm to place said clutch in its free wheeling condition.

10. In a rotary clutch assembly of the type having driving and driven members and a rotary clutch control member rotating with said driving and driven members when the clutch is engaged and operable, upon the application of an anti-rotation force thereto, to disengage said driving member from said driven member, stop means operatively associated with said control member and normally preventing rotation of same thereby to maintain said clutch in disengaged condition, yieldable means continually urging said stop means toward its normal position, impulse means for momentarily shifting said stop means to a second position in which said control member is freed for rotation thereby to cause engagement of said clutch, and means independent of said impulse means for preventing the return of said stop means to said normal position until after said control member is passed through at least one complete revolution, said last mentioned means operated responsive to the passage of said control member from the first to the second revolution following the initial shifting of said stop means.

11. In an intermittently operable clutch unit, a driving shaft, a driven shaft aligned with said driving shaft, a clutch mechanism connecting said driving shaft and said driven shaft having a free wheeling condition in which no power is transmitted and said shafts are free to rotate relative one another and an operative condition in which said driving shaft is rotatively coupled with said driven shaft, said mechanism including a clutch control member normally turning with said shafts and operative, when an anti-rotation force is applied thereto, to place said clutch mechanism in said free wheeling condition, shiftable stop means operatively associated with said control member and normally preventing rotation of same thereby to maintain said clutch mechanism in said free wheeling condition, impulse means for momentarily shifting said stop means to a second position in which said member is freed for rotation thereby to place said clutch mechanism in operative condition, and means independent of said impulse means for preventing return of said stop means to said normal position until after said control member has passed through at least one complete revolution following the initial shifting of said stop means, said last mentioned means operated responsive to the passage of said control member from the first to the second revolution following the initial shifting of said stop means.

References Cited in the file of this patent

UNITED STATES PATENTS

| | | |
|---|---|---|
| 1,040,196 | Harter | Oct. 1, 1912 |
| 2,267,415 | Meyers | Dec. 23, 1941 |
| 2,471,930 | Britten | May 31, 1949 |